United States Patent [19]

Strait

[11] Patent Number: 5,125,299
[45] Date of Patent: Jun. 30, 1992

[54] PORTABLE MACHINE TOOL

[75] Inventor: David S. Strait, Newberg, Oreg.

[73] Assignee: Climax Portable Machine Tools, Inc., Newberg, Oreg.

[21] Appl. No.: 524,391

[22] Filed: May 10, 1990

[51] Int. Cl.$^5$ .............................. B23B 3/26; B23B 5/06
[52] U.S. Cl. ..................................... 82/1.2; 51/241 S; 82/128; 82/172; 408/83.5; 409/178
[58] Field of Search .................. 409/178, 179, 180; 408/77, 78, 83.5; 51/241 S; 82/1.2, 1.4, 128, 172

[56] References Cited

U.S. PATENT DOCUMENTS

| | | | |
|---|---|---|---|
| 1,355,700 | 10/1920 | Salminen | 408/83.5 X |
| 4,114,483 | 9/1978 | Grimsley | 82/102 |
| 4,468,158 | 8/1984 | Pearce et al. | 408/83.5 X |
| 4,759,245 | 7/1988 | Schneider | 82/1.4 |
| 4,856,390 | 8/1989 | Ricci | 82/172 |

FOREIGN PATENT DOCUMENTS 2601299 7/1977 Fed. Rep. of Germany .

*Primary Examiner*—Z. R. Bilinsky
*Attorney, Agent, or Firm*—Dellett, Smith-Hill and Bedell

[57] ABSTRACT

A machine tool comprises a support structure having first and second opposite ends spaced apart along an axis, a drive assembly mounted on the support structure at the first end thereof, the drive assembly comprising at least one drive motor, and an output drive shaft coupled drivingly to the drive motor. The machine tool also comprises a machining head mounted on the support structure at the second end thereof, a tool support member mounted on the machining head and movable relative thereto, and a transmission shaft coupling the output drive shaft to the tool support member to effect movement of the tool support member. The transmission shaft extends parallel to the axis of the support structure over at least a substantial part of the distance of the first end of the support structure from the second end thereof. The machine tool also comprises feed means for effecting synchronous movement of the drive assembly and the machining head relative to the support structure in directions perpendicular to the axis of the support structure.

21 Claims, 5 Drawing Sheets

PORTABLE MACHINE TOOL

BACKGROUND OF THE INVENTION

This invention relates to a portable machine tool, and particularly, but not exclusively, to a tool for in situ repair of large check valves.

A known type of check valve is shown in FIG. 1 of the accompanying drawings. This check valve comprises a valve body 2 defining an inlet 4 and an outlet 8 that communicate by way of a valve cavity 10. The valve body includes a seat member 14 defining a valve seat 16. The external surface of seat member 14 is cylindrical and is coaxial with inlet 4 and outlet 8. A flapper 18 is mounted to pivot relative to valve body 2 about a pivot pin 22 that extends through a horizontal bore in valve body 2. The valve body defines an access passage 26, which is normally closed by a cover plate 30 that is secured to the valve body by bolts 32.

When the pressure of fluid at the inlet 4 is higher that the pressure of fluid at the outlet 8, flapper 18 is pivoted in the counterclockwise direction, away from seat 16 and allows flow of fluid from inlet 4 towards outlet 8. The valve body is formed with a stop 34 to limit pivotal movement of the flapper in the counterclockwise direction. If the pressure at outlet 8 should exceed the pressure at inlet 4, flapper 18 is forced into seating engagement with seat 16 and prevents flow in the reverse direction It is necessary from time to time to repair valves of the kind shown in FIG. 1. One of the repair operations involves removing the valve seat member 14 so that a new seat member can be installed. This may be accomplished by mounting a machining head inside the valve cavity. A cutting element is supported relative to the machining head and is connected to drive motors so that it is able to be rotated about the common axis 36 of the inlet and outlet and can be fed radially (R) and longitudinally (Z) relative to axis 36. The limited space available in the valve cavity effectively requires that the motors for driving the machining head be disposed outside the valve cavity and connected to the cutting element through a transmission mechanism that extends through the access passage 26.

In some applications it is desirable that the machining head be positioned inside the valve cavity without need for personnel to enter the valve cavity. Therefore, it is desirable to mount the machine tool from the exterior of the valve body.

One possible solution would be to mount the machining head to a support structure that extends through the access passage in a manner such as to prevent movement of the machining head relative to the support structure in the Z direction, and advance the machining head in the Z direction by moving the support structure in the Z direction. However, the limited range of movement between the stop 34 and the opposite side of the access passage limits the feed that can be accomplished.

Alternatively, the support structure may be mounted stationarily to the valve body and universal joints employed to accommodate shift of the machining head relative to the drive motors.

SUMMARY OF THE INVENTION

In accordance with the present invention, a machine tool comprises a support structure having first and second opposite ends spaced apart along an axis, a drive assembly mounted on the support structure at the first end thereof, the drive assembly comprising at least one drive motor, and an output drive shaft coupled drivingly to said drive motor. The machine tool also comprises a machining head mounted on the support structure at the second end thereof, a tool support member mounted on the machining head and movable relative thereto, and transmission means coupling the output drive shaft to the tool support member to effect movement of the tool support member. The transmission means include a transmission shaft extending parallel to said axis over at least a substantial part of the distance of the first end of the support structure from the second end thereof. The machine tool also comprises feed means for effecting synchronous movement of the drive assembly and the machining head relative to the support structure in directions perpendicular to said axis.

BRIEF DESCRIPTION OF THE DRAWINGS

For a better understanding of the invention, and to show how the same may be carried into effect, reference will now be made, by way of example, to the accompanying drawings in which.

In the several figures of the drawings, like reference numerals designate corresponding components.

DETAILED DESCRIPTION

Figure 1:
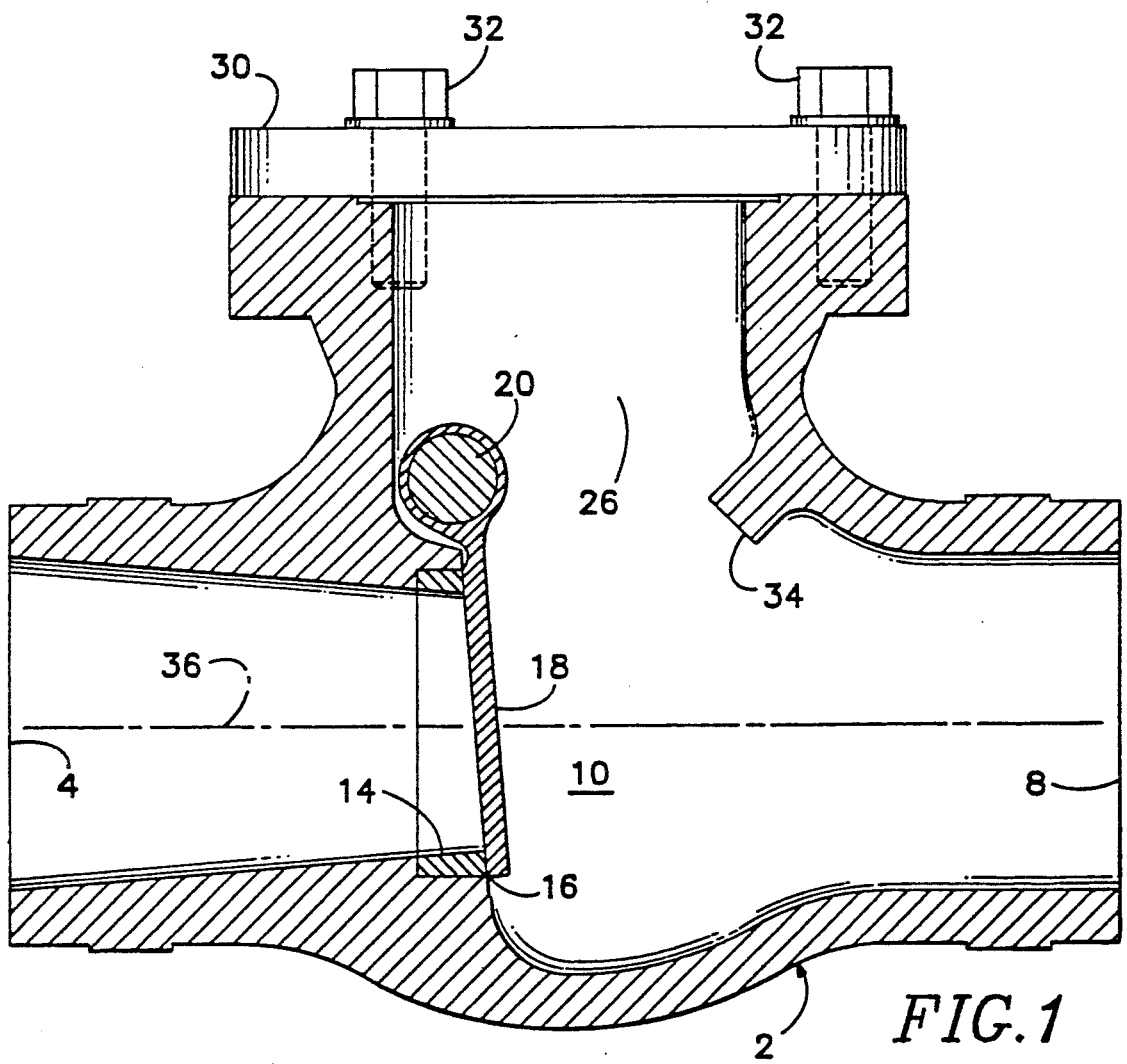
FIG. 1 is a longitudinal sectional view of a check valve.
Figure 2:
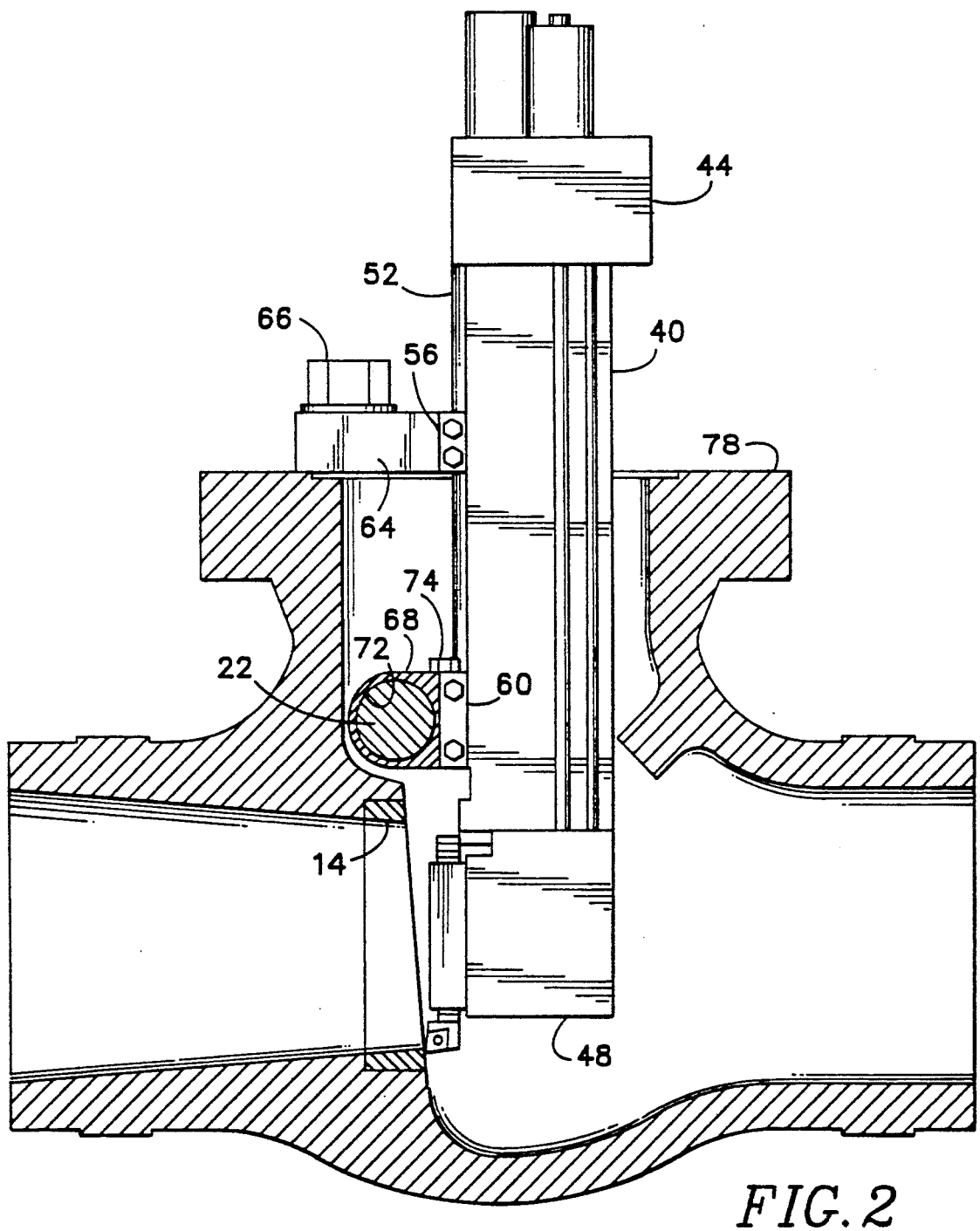
FIG. 2 is a longitudinal sectional view of the valve of FIG. 1 and shows a side elevation of a repair machine embodying the invention installed in the valve and ready for operation.

The valve repair machine shown in FIGS. 2-6 comprises a hollow support beam 40, a drive unit 44 mounted on the upper end of the support beam, and a machining head 48 mounted on the support beam at its lower end. The support beam is rigid and has a dovetail 52 projecting from one edge, and is mounted to the valve body 2 by upper and lower clamps 56 and 60. Clamps 56 and 60 each have a dovetail groove through which dovetail 52 extends and are clamped to dovetail 52 so that they are not movable relative to support beam 40. Clamp 56 is rigidly secured to an adapter plate 64, which is bolted to valve body 2 using bolts 66 that extend into the holes in valve body 2 that are used for attachment of cover 30.

Clamp 60 is rigidly attached to a sleeve 68, which defines a bore 72 and has a split collar 70 at each end. Clamp 60 is secured to the dovetail 52 at a position such that when adapter plate 64 is bolted to valve body 2, the central axis of bore 68 coincides with the central axis 76 of the horizontal bore that receives pivot pin 22. Pivot pin 22 is fitted through bore 72 and collars 70 are tightened onto pin 22 by screws 74. In this manner, beam 40 is rigidly mounted to valve body 2 and machining head 48 is positioned inside the valve cavity while drive assembly 44 is positioned outside the valve cavity. The distances of the top surface 78 of the valve body 2 from axis 76 and from the central axis 36 are accurately known, and therefore machining head 48 can be accurately positioned relative to seat member 14.

Machining head 48 comprises a hollow outer drive shaft 80 (FIG. 5) having a rack holding boss 114 at one end and a worm gear 100 at its opposite end. Shaft 80 is supported by bearings 84 inside a metal housing 88 in a manner such as to permit rotational movement of shaft 80 relative to housing 88 while preventing linear movement of shaft 80 relative to housing 88. Rack holding boss 114 receives a tool support rack 116 that extends parallel to a diameter of shaft 80. Rack holding boss 114 allows longitudinal movement of rack 116 but prevents movement of rack 116 in other directions. At one end, rack 116 carries a cutting element 120. An inner drive shaft 92 extends coaxially within outer drive shaft 80, being supported therein by bearings, including bearings 96, in a manner permitting rotational movement of shaft 92 relative to shaft 80 but preventing relative longitudinal movement of the shafts. Shaft 92 has a pinion 124 at one end in meshing engagement with rack 116, and is provided with a worm gear 108 at its opposite end. Worm gear 100 is in meshing engagement with a worm 104, and worm gear 108 is in meshing engagement with a worm 112.

It will be appreciated that so long as shafts 80 and 92 rotate at equal angular velocities, tool support rack 116 will remain stationary relative to shaft 80. However, if shaft 92 rotates relative to shaft 80, tool support rack 116 will be moved longitudinally, adjusting the radial position of cutting element 120, in a direction depending upon the sense of relative rotation.

Drive assembly 44 comprises two electrical stepper motors 140 and 144 having shafts 142 and 146 respectively, and has first and second output drive shafts 148 and 152. Drive assembly 44 comprises a differential transmission (not specifically shown) coupling stepper motor 140 to output drive shafts 148 and 152 in a manner such that shaft 148 rotates with an angular velocity directly proportional to the angular velocity of rotation of the shaft of motor 140 and output drive shaft 152 rotates at an angular velocity equal to twice the angular velocity of rotation of shaft 148 plus an amount that is directly proportional to the angular velocity of rotation of the shaft of motor 144. The differential transmission is not shown in the drawings and will not be described further herein, because it is of a kind that is well known in the art.

Shafts 148 and 152 are coupled by respective transmission shafts 160 and 164 to pinions 104 and 112 respectively. The mechanical advantage of worm 104 and worm gear 100 is half that of worm 112 and worm gear 108, and therefore so long as shaft 146 does not rotate, shaft 92 does not rotate relative to shaft 80. If the shaft of motor 144 rotates, shaft 92 rotates relative to shaft 80 with an angular velocity proportional to the angular velocity of rotation of the shaft of motor 144 and accomplishes radial feed of cutting element 120.

Drive assembly 44 is mounted on support beam 40 by means of a dovetail 168 that allows movement of drive assembly 44 relative to support beam 40 in a direction perpendicular to dovetail 52. Machining head 48 is mounted on support beam 40 by means of a dovetail 172 that allows movement of machining head 48 relative to support beam 40 in a direction parallel to the direction of movement of drive assembly 44. A Z axis motor 180 is mounted inside support beam 40 by means not shown and its shaft is connected through a gear 184 to a shaft 188. Shaft 188 is mounted inside beam 40 by appropriate bearings (not shown) that allow shaft 188 to rotate relative to beam 40 but restrain shaft 188 against linear movement relative to beam 40. Shaft 188 extends parallel to dovetail 52. At its upper and lower ends, shaft 188 is connected through bevel gears 192, 196 to respective lead screws 200, 204, which extend parallel to the dovetails 168, 172 and are in threaded engagement with lugs 208 and 212 projecting from drive assembly 44 and machining head 48 respectively. Thus, when motor 180 is operated, drive assembly 44 and machining head 48 are shifted in phase with each other along the respective dovetail slides. In this manner, Z axis feed of cutting element 120 is accomplished.

A machine controller (not shown) applies electrical drive signals to motors 140, 144 and 180 to drive those motors at precisely controlled angular velocities depending on the nature of movement required.

It will be seen that the illustrated valve repair machine provides for Z axis feed without need for support beam 40 to move along the Z axis and without need for universal joints in the drive train between motors 140, 144 and gears 100, 108.

It will be appreciated that the invention is not restricted to the particular embodiment that has been described and illustrated, and that variations may be made therein without departing from the scope of the invention as defined in the appended claims and equivalents thereof. For example, the invention is not restricted to the drive motors 140, 144 and 180 being electrical stepper motors, and indeed it may be appropriate in other applications to employ manual control for the Z axis feed and radial feed. The invention is not restricted to the particular mechanism used for mounting the support beam relative to the valve body. Further, the invention is not restricted to use of lead screws and nuts to achieve Z axis translation of drive assembly 44 and machining head 48. For example, shaft 188 could be provided with pinions at its upper and lower ends, engaging respective racks on the drive assembly and the machining head.

What is claimed is:

1. A machine tool comprising:
   a support structure having first and second opposite ends spaced apart along an axis,
   a drive assembly mounted on the support structure at said first end thereof, said drive assembly comprising at least one drive motor, first and second output drive shafts coupled drivingly to said drive motor and means for adjusting the relative angular velocities of rotation of said output drive shafts,
   a machining head mounted on the support structure at the second end thereof,
   a tool support member mounted on the machining head and movable relative thereto in first and second degrees of freedom,
   transmission means coupling the first and second output drive shafts to the tool support member to effect movement of the tool support member in the first and second degrees of freedom, said transmission means including first and second transmission shafts extending parallel to said axis over at least a substantial part of the distance from the first end of the support structure to the second end thereof, and
   feed means for effecting synchronous movement of the drive assembly and the machining head relative to the support structure in directions perpendicular to said axis.

2. A machine tool according to claim 1, wherein the drive assembly comprises a second drive motor and a differential transmission such that the angular velocity of rotation of the first drive shaft is directly proportional to the angular velocity of rotation of the shaft of the first motor and the angular velocity of rotation of the second drive shaft is dependent on both the angular velocity of rotation of the shaft of the first motor and the angular velocity of rotation of the shaft of the second motor.

3. A machine tool according to claim 2, wherein the machining head comprises an outer shaft that is coupled drivingly to the first transmission shaft to be rotated thereby and is coupled drivingly to the tool support member to rotate the tool support member about the axis of the outer shaft, and an inner shaft that extends coaxially within the outer shaft and is coupled drivingly to the second transmission shaft to be rotated thereby and is coupled drivingly to the tool support member.

4. A machine tool according to claim 3, wherein the tool support member is mounted on the outer shaft for rotation therewith and for movement linearly in directions parallel to a diameter of the outer shaft.

5. A machine tool according to claim 4, wherein the tool support member comprises a rack and the machining head comprises a pinion coupled drivingly to the inner shaft and in meshing engagement with the rack, so that when the inner shaft and outer shaft rotate at equal angular velocities the tool support member rotates at the same angular velocity and remains stationary relative to the inner and outer shafts, whereas when the inner shaft rotates relative to the outer shaft the tool support member is driven linearly with respect to the outer shaft.

6. A machine tool according to claim 1, wherein the drive assembly and the machining head are mounted on the support structure by first and second dovetail slides respectively, the dovetail slides allowing movement of the drive assembly and the machining head relative to the support structure only along mutually parallel axes of displacement.

7. A machine tool comprising:
a support structure having first and second opposite ends spaced apart along an axis,
a drive assembly mounted on the support structure at said first end thereof, said drive assembly comprising at least one drive motor and an output drive shaft coupled drivingly to said drive motor,
a machining head mounted on the support structure at the second end thereof,
a tool support member mounted on the machining head and movable relative thereto,
transmission means coupling said output drive shaft to the tool support member to effect movement of the tool support member, said transmission means including a transmission shaft extending parallel to said axis over at least a substantial part of the distance from the first ends of the support structure to the second end thereof, and
feed means for effecting synchronous movement of the drive assembly and the machining head relative to the support structure in directions perpendicular to said axis, and wherein the feed means comprise a feed shaft extending parallel to said axis and coupled drivingly at opposite respective ends to the drive assembly and the machining head in a manner such that rotation of the feed shaft causes synchronous movement of the drive assembly and the machining head relative to the support structure with equal velocities.

8. A machine tool comprising:
a support structure having first and second opposite ends spaced apart along an axis,
a drive assembly mounted on the support structure at said first end thereof,
a machining head mounted on the support structure at the second end thereof, and
a feed shaft coupled drivingly at opposite respective ends to the drive assembly and the machining head in a manner such that rotation of the feed shaft relative to the support structure causes synchronous movement of the drive assembly and the machining head relative to the support structure in directions perpendicular to said axis.

9. A machine tool according to claim 8, further comprising means for attaching the support structure to a workpiece in a manner preventing movement of the support structure relative to the workpiece in directions perpendicular to said axis.

10. A machine tool according to claim 8, further comprising a tool support member mounted on the machining head and movable relative thereto.

11. A machine tool according to claim 10, wherein the drive assembly has an output drive shaft, and the machine tool further comprises transmission means coupling said output drive shaft to the tool support member to effect movement of the tool support member, said transmission means including a transmission shaft extending parallel to said axis over at least a substantial part of the distance from the first end of the support structure to the second end thereof.

12. A machine tool comprising:
a support structure having first and second opposite ends spaced apart along an axis,
a drive assembly mounted on the support structure at said first end thereof, said drive assembly comprising at least one drive motor, first and second output drive shafts coupled drivingly to said drive motor, and means for adjusting the relative angular velocities of rotation of said output drive shafts,
a machining head mounted on the support structure at the second end thereof,
a tool support member mounted on the machining head and movable relative thereto in first and second degrees of freedom, the first and second output drive shafts being coupled to the tool support member to effect movement of the tool support member in the first and second degrees of freedom, and
means coupling the drive assembly and the machining head for synchronous movement relative to the support structure in directions perpendicular to said axis.

13. A machine tool according to claim 12, wherein the drive assembly comprises a second drive motor and a differential transmission such that the angular velocity of rotation of the first drive shaft is directly proportional to the angular velocity of rotation of the shaft of the first motor and the angular velocity of rotation of the second drive shaft is dependent on both the angular velocity of rotation of the shaft of the first motor and the angular velocity of rotation of the shaft of the second motor.

14. A machine tool according to claim 12, comprising first and second transmission shafts extending parallel to said axis over at least a substantial part of the distance from the first end of the support structure to the second end thereof and coupling said first and second output drive shafts to the tool support member.

15. A machine tool according to claim 14, wherein the machining head comprises an outer shaft that is coupled drivingly to the first transmission shaft to be rotated thereby and is coupled drivingly to the tool support member to rotate the tool support member about the axis of the outer shaft, and an inner shaft that extends coaxially within the outer shaft and is coupled drivingly to the second transmission shaft to be rotated thereby and is coupled drivingly to the tool support member.

16. A machine tool according to claim 15, wherein the tool support member is mounted on the outer shaft for rotation therewith and for movement linearly in directions parallel to a diameter of the outer shaft.

17. A machine tool according to claim 16, wherein the tool support member comprises a rack and the machining head comprises a pinion coupled drivingly to the inner shaft and in meshing engagement with the rack, so that when the inner shaft and outer shaft rotate at equal angular velocities the tool support member rotates at the same angular velocity and remains stationary relative to the inner and outer shafts, whereas when the inner shaft rotates relative to the outer shaft the tool support member is driven linearly with respect to the outer shaft.

18. A machine tool according to claim 8, wherein the drive assembly and the machining head are mounted on the support structure by first and second dovetail slides respectively, the dovetail slides allowing movement of the drive assembly and the machining head relative to the support structure only along mutually parallel axes of displacement.

19. A machine tool according to claim 12, wherein the means coupling the drive assembly and the machining head comprise a feed shaft extending parallel to said axis and coupled drivingly at opposite respective ends to the drive assembly and the machining head in a manner such that rotation of the feed shaft causes synchronous movement of the drive assembly and the machining head relative to the support structure with equal velocities.

20. A tool for machining a valve defining a valve chamber having a fluid inlet and a fluid outlet and an access passage for giving access to the valve chamber, the tool comprising:
a support structure having first and second opposite ends spaced apart along an axis, the support structure being attached to the valve so that it extends within the access passage with the first end of the support structure outside the valve chamber and the second end inside the valve chamber,
a drive assembly mounted on the support structure at said first end thereof,
a machining head mounted on the support structure at the second end thereof, and
means coupling the drive assembly and the machining head for synchronous movement relative to the support structure in directions perpendicular to said axis, whereby the machining head can be moved within the valve chamber while remaining stationary relative to the drive assembly.

21. A tool according to claim 20, wherein the drive assembly has an output drive shaft, and the tool further comprises a tool support member mounted on the machining head and movable relative thereto, and transmission means coupling said output drive shaft to the tool support member to effect movement of the tool support member.

* * * * *

UNITED STATES PATENT AND TRADEMARK OFFICE
CERTIFICATE OF CORRECTION

Figure 3:
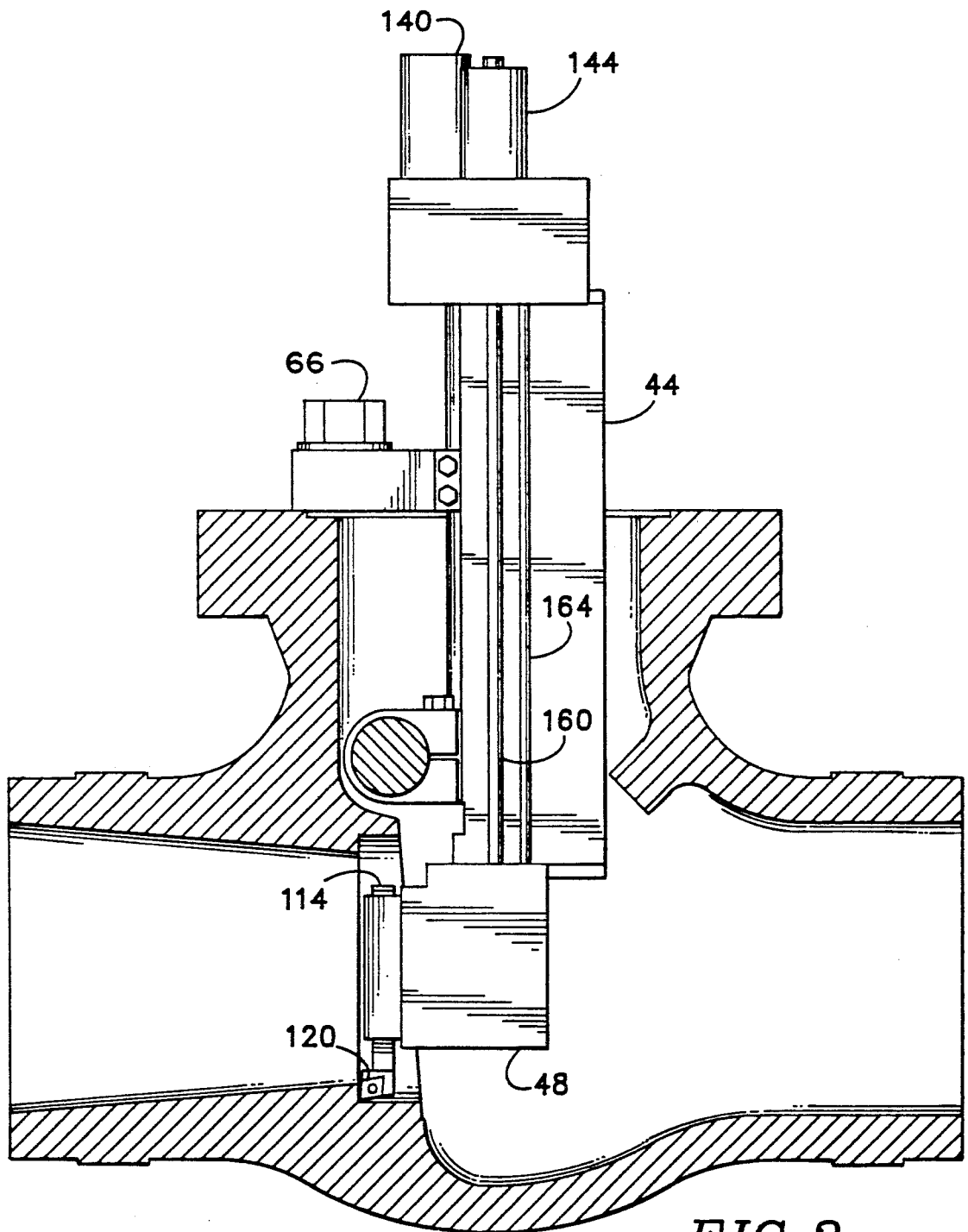
FIG. 3 is a view similar to FIG. 2 illustrating the valve repair machine after removal of the valve seat member.
Figure 4:
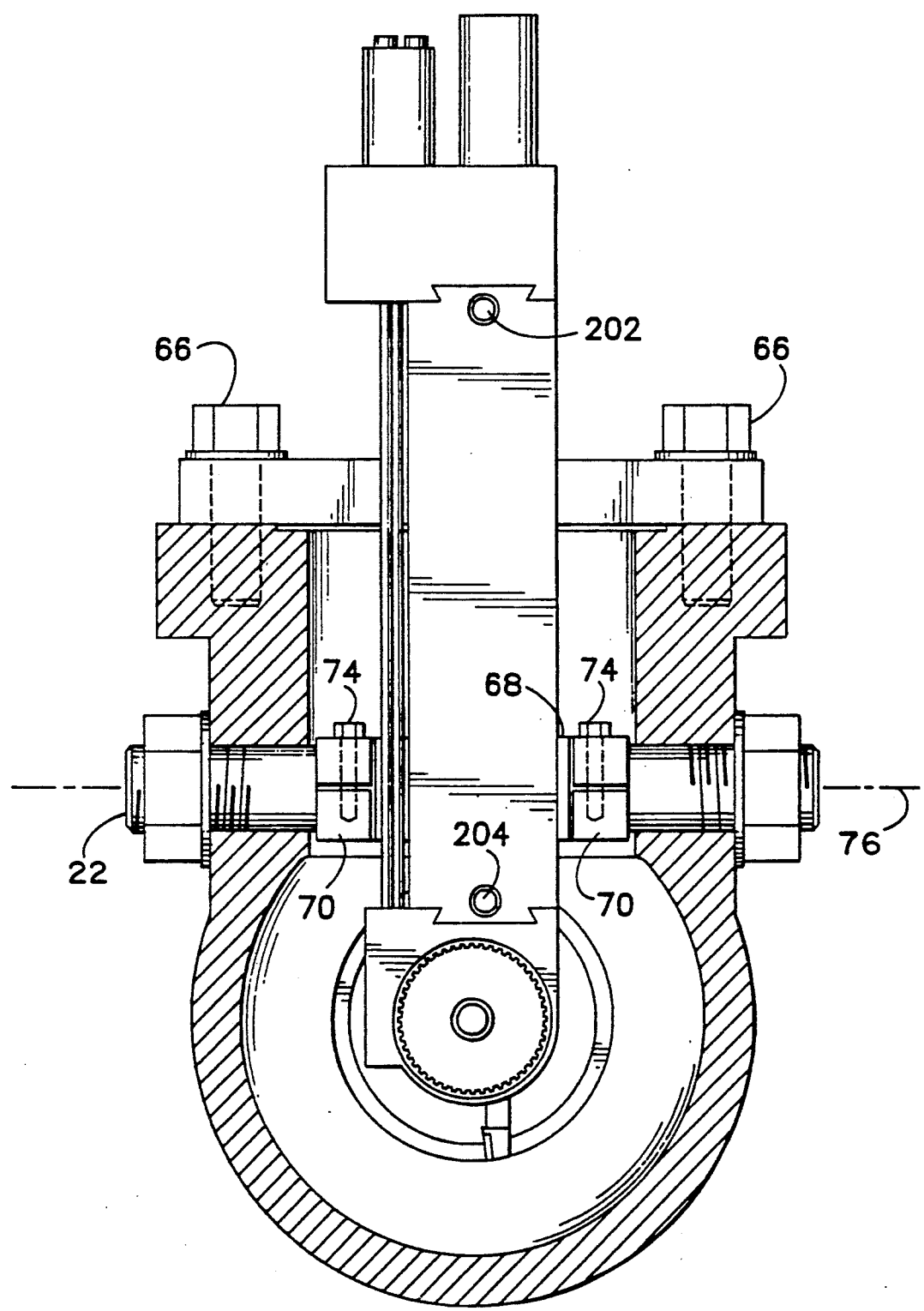
FIG. 4 is a view in which the valve body is shown in section and the valve repair machine is shown in end elevation.
Figures 5, 6:
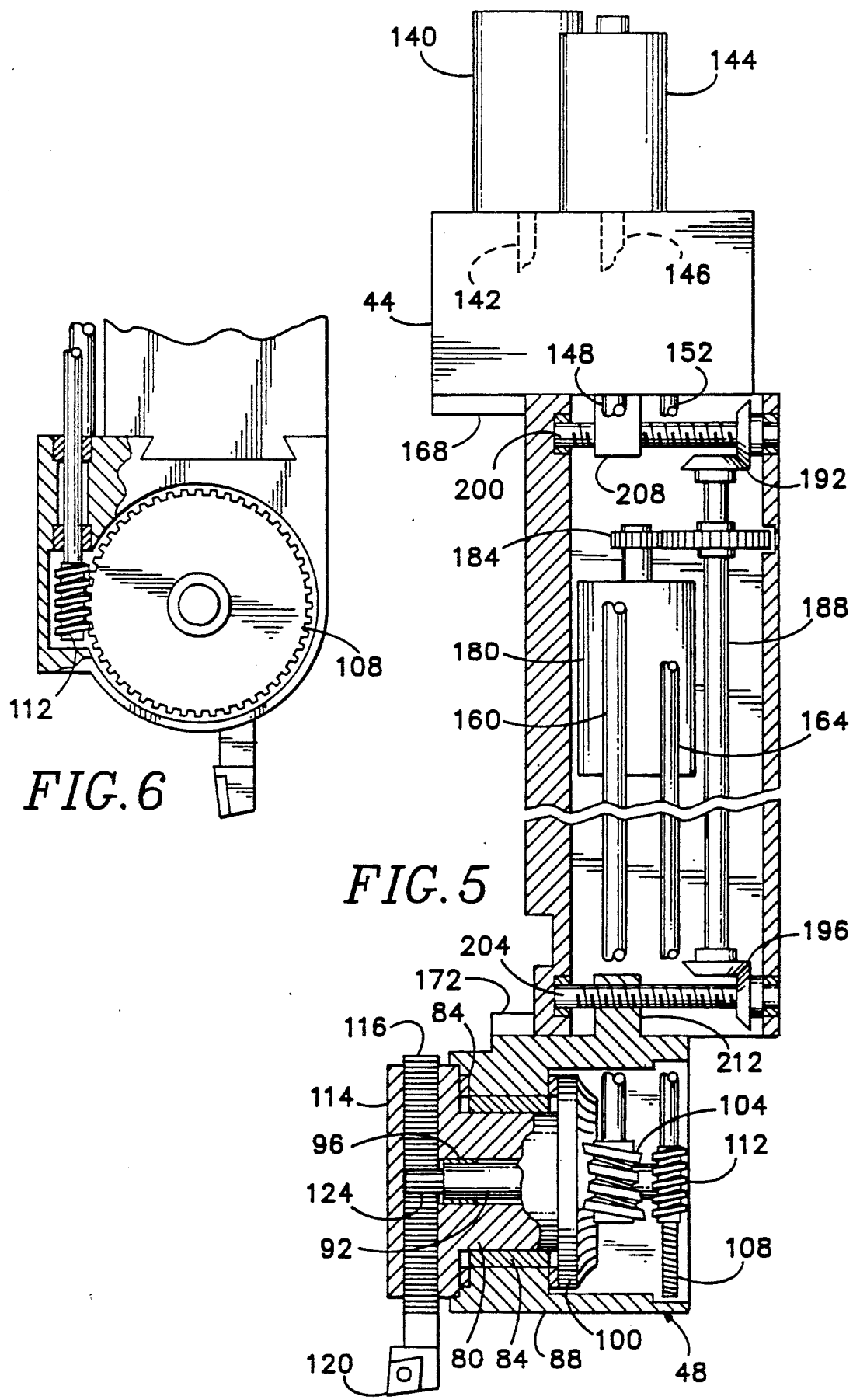
FIG. 5 is an enlarged partial sectional view of FIG. 4.
FIG. 6 is a partial sectional view taken in a plane perpendicular to FIG. 5.
Figure 3:
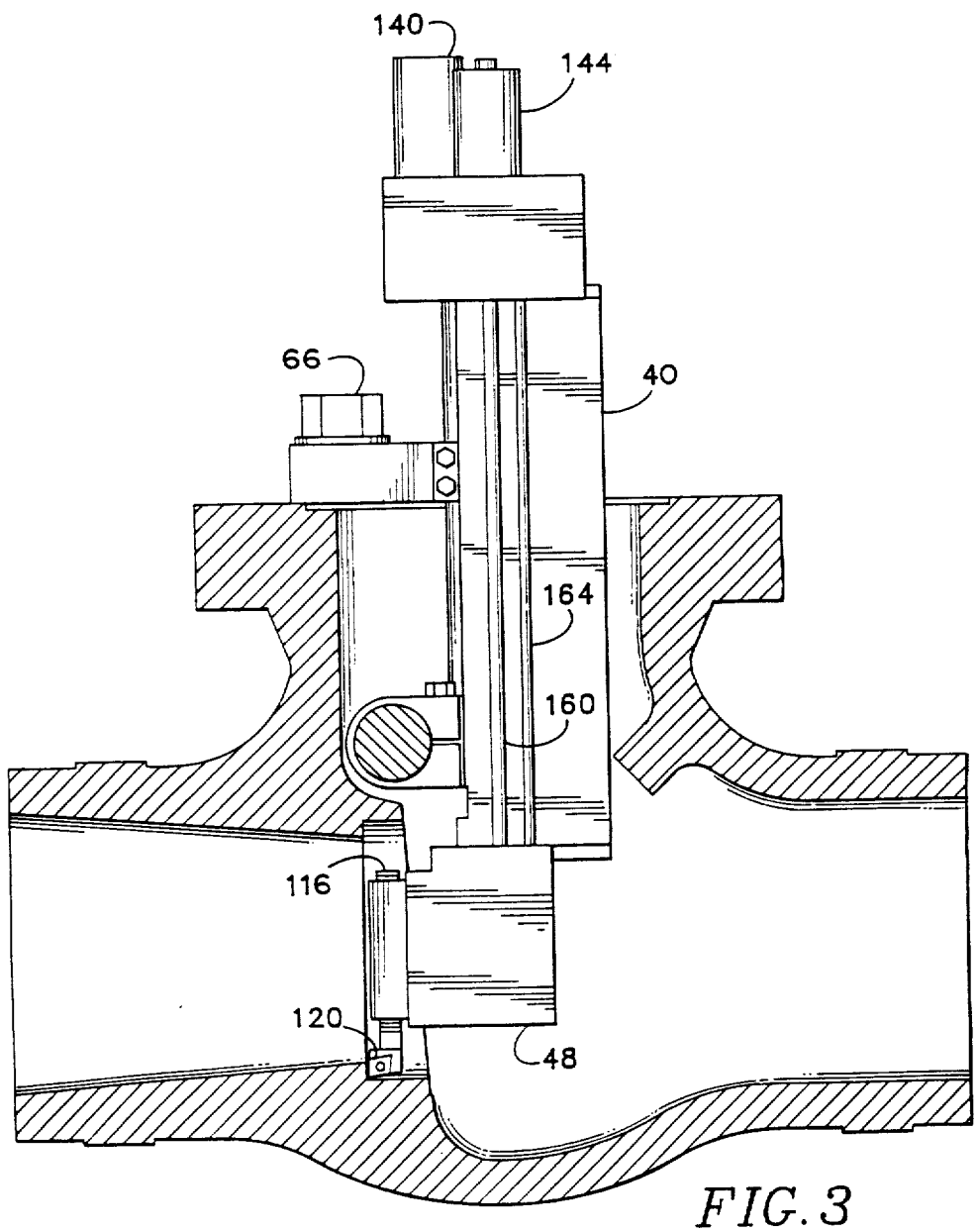

PATENT NO. :   5,125,299
DATED      :   June 30, 1992
INVENTOR(S) :  David S. Strait It is certified that error appears in the above-identified patent and that said Letters Patent is hereby corrected as shown below:

The drawing sheet consisting of Fig. 3, should be deleted to be replaced with the attached sheet of drawing.

Signed and Sealed this

Sixteenth Day of November, 1993

*Attest:*

BRUCE LEHMAN

*Attesting Officer*     Commissioner of Patents and Trademarks